UNITED STATES PATENT OFFICE.

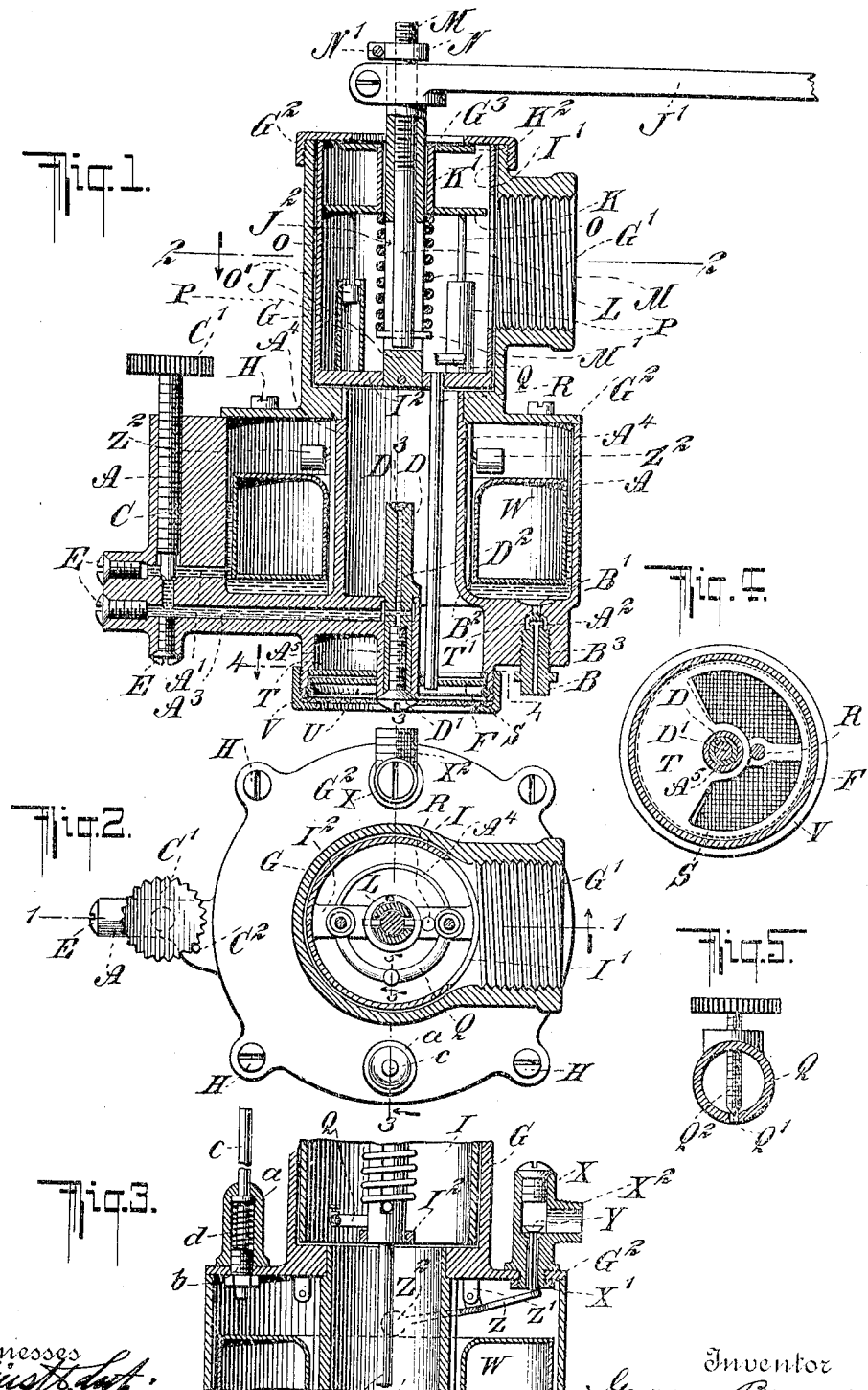

GEORGE BREEZE, OF NEWARK, NEW JERSEY, ASSIGNOR TO BREEZE MOTOR MANUFACTURING COMPANY, OF NEWARK, NEW JERSEY, A CORPORATION OF NEW JERSEY.

CARBURETER FOR HYDROCARBON-ENGINES.

No. 913,354.　　　　Specification of Letters Patent.　　　Patented Feb. 23, 1909.

Application filed October 29, 1904. Serial No. 230,455.

*To all whom it may concern:*

Be it known that I, GEORGE BREEZE, a subject of the King of Great Britain, resident of Newark, county of Essex, State of New Jersey, have invented certain new and useful Improvements in Carbureters for Hydrocarbon-Engines, of which the following is a specification.

My invention relates to carbureters for explosive engines, and has for its object to provide a compact and efficient carbureter which will automatically regulate the proportion of fuel and air according to the amount of suction produced by the engine; provision is also made for a proper regulation of the air supply to the carbureter in connection with the adjustment of the throttle valve.

Other features of my invention relate to the fuel inlet valve, the fuel spray nozzle, the carbureter casing, and the drain plug.

My improved carbureter is also distinguished by a central unobstructed draft of the fuel mixture to the engine connection.

Further novel features of my invention will appear from the description following hereinafter and from the appended claims.

Reference is to be had to the accompanying drawings, in which—

Figure 1 is a sectional elevation on line 1—1 of Fig. 2; Fig. 2 is a plan with parts in section on line 2—2 of Fig. 1; Fig. 3 is a partial vertical section on line 3—3 of Fig. 2; Fig. 4 is a horizontal section on line 4—4 of Fig. 1; and Fig. 5 is an enlarged vertical section on line 5—5 of Fig. 2.

The improved carbureter preferably consists of two main parts, the lower one of which is the float chamber with a permanent air inlet, the spray nozzle, and the valve controlling the flow of fuel from the float chamber to the said nozzle. The upper section forms a cover for the float chamber and carries the fuel inlet valve, the float-actuated lever which controls said valve, the throttle valve, and the automatic regulator or gate for proportioning the supply of air and fuel automatically.

A is the float chamber having an outlet passage A' at a point slightly above the bottom of the chamber, so that sediment and water may be retained in the chamber instead of passing to the engine. A drain plug is provided for the removal of matter contained below the level of the outlet passage A'. As shown this drain plug B is set in a passage $A^2$ having a valve seat near its inner end and a screw thread at its outer portion. The screw plug B has a valve portion B' which normally fits the seat tightly so as to close the drain passage $A^2$. If the plug is unscrewed slightly so as to unseat the valve B', the liquid can pass from the float chamber to the passage $A^2$, thus reaching perforations $B^2$ below the valve B' and a central channel $B^3$ in the plug. The liquid can thus escape, and it is not necessary to completely unscrew the plug B for this purpose.

In the passage A' is located the adjustable needle valve C controlling the flow of gasolene or other fluid to the spray nozzle D, through the supply channel $A^3$.

E are plugs for normally closing apertures through which the passages may be cleaned.

The spray nozzle D is located centrally within the tubular inner wall $A^4$ of the float chamber, and as shown is held detachably by means of a screw D', the beveled head of which is larger than the nozzle and fits against a seat at the lower end of the socket $A^5$ located centrally of the casing. The upper end of this socket engages a shoulder on the nozzle.

After removal of the screw, D', the nozzle may be withdrawn upwardly. The bore $D^2$ of the nozzle communicates with the supply channel $A^3$, and the outlet of the nozzle is preferably enlarged or flared by making the upper end of the nozzle with a cup or depression $D^3$ in which a small amount of gasolene will collect when the engine is stopped. This amount will be sufficient in most cases to start the engine, and by constructing the nozzle as above described the neccessity of a special operation for priming or starting the carbureter is largely avoided. Another advantage of this flared nozzle construction is that it produces a spreading jet or spray of gasolene, and therefore a more perfect mixture with the surrounding air.

The permanent air supply is preferably located at the bottom, and may be provided with a screen F to exclude dust. The air passes up in the central space surrounding the nozzle D and mixes in the said space with the gasolene or other fuel issuing at the nozzle D.

The upper section G of the carbureter is adapted to fit around the reduced upper end of the tubular wall $A^4$ and upon the top of the lower section A, being secured thereto by screws H. This upper section is substantially tubular, communicating at the bottom with the chamber which contains the nozzle D, and at the side through a connection G' with the inlet port of the engine. The top $G^2$ may be a screw cap so as to allow the upper section to be readily dismembered. In the cylindrical chamber of said upper section is located a throttle valve I having a lateral opening I' of rectangular or oval shape to cut off more or less the connection with the engine pipe G'. The throttle valve I is secured to a rod J rigid with an operating crank J' which is worked from the seat through suitable connections.

The throttle valve I is cylindrical and contains a gate K movable lengthwise of the rod J and normally pressed upward by a spring L. This gate is connected by a sleeve K' with a valve $K^2$ adapted to close a supplementary air inlet $G^3$ in the cap or cover $G^2$. A spring L coiled around the rod J tends to force the gate K and valve $K^2$ upward so as to close the opening $G^3$. The gate K is in such a position as to divide the outlet G' into two channels, an upper channel for the air admitted through the supplementary inlet $G^3$, and a lower channel for the air and fuel mixture coming from the central chamber below. Should the engine suction increase, the gate K will be drawn farther down, and the supplementary air inlet will be opened so as to increase the proportion of air and decrease the proportion of fuel. The spring L will restore the parts to their upper position. In order that the tension of this spring may be readily adjusted, the lower end of the spring abuts against a pin M', movable up and down in a slot $J^2$ of the rod J, said pin being secured to a screw rod M adjustable vertically in the tubular upper portion of the rod J. A split nut N provided with a securing device such as a clamping screw N' serves to hold the rod M after adjustment.

For the purpose of preventing too sudden a movement of the gate K, I may provide a dash-pot or checking arrangement consisting as shown of two rods O and pistons O' secured to the gate K and working in cylinders P carried by the cross bar $I^2$ at the bottom of the throttle valve I. Each cylinder may have a small vent, and these ports may be connected by a tube Q so as to keep the same pressure in both cylinders; from this tube an opening Q', controlled by a needle valve $Q^2$, leads to the atmosphere. By adjusting this needle valve, the dash-pot action may be regulated.

With the throttle-valve I is connected eccentrically a rod R parallel with the axis of the said valve. This rod connects with a damper sector S pivoted at the main air inlet about an axis alining with that of the throttle valve. This damper is adapted to close more or less the main air inlet T' provided in a plate T. Plates S and T fit around the socket $A^5$ and are held in place together with a packing ring U and the screen F, by a cap V. To facilitate the separation of the parts, the rod R may be permanently secured to the cross bar $I^2$, but only loosely engaged with the damper S. It will be understood that as the throttle valve I is closed, the area of the main air inlet will be reduced proportionately. The area of the opening T' should preferably be about equal to the area of the spray chamber formed by the wall $A^4$. The plate $G^2$ which forms a cover for the chamber containing the float W, also carries the fuel inlet, the priming device, and the float controlled lever which actuates the inlet valve.

The fuel inlet consists of a casing X having a screw-threaded portion adapted to be projected through an opening in the cover $G^2$ and to be secured in any desired position by a nut X'. A lateral nipple $X^2$ is adapted to receive the gasolene or other fuel from a suitable tank. The connection of the nipple with the float chamber is controlled by a valve Y, adapted to be seated by the flow of the gasolene and by gravity. The stem of this valve is angular and is adapted to be engaged by one end of the lever Z, fulcrumed on a bracket Z' of the cover $G^2$. The other end of this lever is forked and has round portions $Z^2$ resting on the float W, being so adjusted that the level of liquid in the float chamber will be about even with the tip of the nozzle D. Should the liquid sink below this level, the outer end of the lever Z will rise to open the valve Y and admit more gasolene.

At a suitable point of the cover $G^2$ is located the priming arrangement which may consist of a small casing $a$ having a screw plug $b$ with a flange to fit against the under surface of the cover. The plug is tubular and receives the priming pin $c$ normally held up by a spring $d$. By pushing the pin inward the float W will be depressed to open the valve.

The gasolene supply connection $X^2$ can be adjusted to be either radial as shown, or to any other angle. In some cases, it may be more convenient to place the inlet valve on the other side of the carbureter; for this purpose, the said valve and the priming device are so constructed that their positions may be interchanged, and an additional bracket Z' is placed on the other side of the float chamber as shown in Fig. 3, so that the lever Z may be shifted from one side to the other if desired.

The needle valve C is locked against accidental change of adjustment, by a pin $C^2$ engaging the serrated head $C'$ of the said valve.

The entire carbureter can be taken apart readily.

Various modifications may be made without departing from the nature of my invention.

It will be seen that all parts of the carbureter which require adjustment, such as the needle valve, are carried entirely by one of the sections of the device, so that when the carbureter is dismembered, the adjustment of such parts is not altered.

I claim—

1. A carbureter having a mixing chamber, an outlet for the mixture, a gate movable transversely of the outlet and arranged to divide it into two passages one of which communicates with the mixing chamber, and an air inlet connected with the other passage.

2. A carbureter having a float chamber, a mixing chamber surrounded thereby, a socket arranged in the axis of said mixing chamber, a spray nozzle held in said socket and communicating with the float chamber, and a screw fitted into said nozzle and having an enlarged head engaging a shoulder on said socket.

3. A carbureter having an annular float chamber, a central mixing chamber, a socket located in the axis of the mixing chamber and having a connection with the float chamber, a spray nozzle provided with a shoulder adapted to engage one end of said socket, and detachable means located at the other end of the nozzle for holding it in the socket.

4. A carbureter having a mixing chamber, an outlet for the mixture, a gate movable transversely of said outlet to vary the area of the passage from the mixing chamber to the outlet, a valve connected with said gate and located on the side opposite to that facing the mixing chamber, a supplementary air inlet controlled by said valve, a spring tending to force the valve to its seat, a retarding or checking device located on the mixing chamber side of the gate and consisting of a piston and a cylinder in which said piston is movable, and an adjustable valve controlling the outlet from said cylinder.

5. A carbureter having a mixing chamber and outlet for the mixture, a movable gate to vary the area of the passage from the mixing chamber to the outlet, a valve connected with said gate to move in unison therewith, a supplementary inlet controlled by said valve, a spring tending to force the valve to its seat, and a retarding or checking device arranged to work in opposition to said spring and consisting of a plurality of pistons and cylinders in which said pistons are movable, the chambers of said cylinders being connected so as to equalize the pressure in them.

In testimony whereof, I have signed this specification in the presence of two subscribing witnesses.

GEORGE BREEZE.

Witnesses:
JOHN LOTKA,
JOHN A. KEHLENBECK.